US011880777B2

(12) United States Patent
Domnick (10) Patent No.: US 11,880,777 B2
(45) Date of Patent: Jan. 23, 2024

(54) DRIVER LOG RETENTION SYSTEM

(71) Applicant: OMNITRACS, LLC, Dallas, TX (US)

(72) Inventor: Lauren Domnick, Muskego, WI (US)

(73) Assignee: OMNITRACS, LLC, Dallas, TX (US)

( * ) Notice: Subject to any disclaimer, the term of this patent is extended or adjusted under 35 U.S.C. 154(b) by 901 days.

(21) Appl. No.: 15/412,199

(22) Filed: Jan. 23, 2017

(65) Prior Publication Data

US 2018/0211170 A1    Jul. 26, 2018

(51) Int. Cl.
*G06N 5/02*  (2023.01)
*G06Q 10/0631*  (2023.01)
*G06Q 10/0635*  (2023.01)
*G06N 5/025*  (2023.01)

(52) U.S. Cl.
CPC ......... *G06N 5/025* (2013.01); *G06Q 10/0635* (2013.01); *G06Q 10/06311* (2013.01)

(58) Field of Classification Search
CPC ............. G06N 5/025; G06Q 10/06311; G06Q 10/0635
See application file for complete search history.

(56) References Cited

U.S. PATENT DOCUMENTS

| | | |
|---|---|---|
| 8,075,484 B2 | 12/2011 | Moore-Ede |
| 9,685,098 B1 * | 6/2017 | Kypri .................. G09B 19/167 |
| 2007/0016542 A1 | 1/2007 | Rosauer et al. |
| 2014/0344174 A1 * | 11/2014 | Ruan .................... G06Q 10/105 705/320 |
| 2015/0248644 A1 | 9/2015 | Zenger et al. |
| 2016/0180291 A1 * | 6/2016 | Beck .................. G06Q 10/1053 705/7.28 |
| 2017/0206487 A1 * | 7/2017 | Gloudemans .. G06Q 10/063114 |
| 2017/0351812 A1 * | 12/2017 | Green .................... G16B 40/00 |

FOREIGN PATENT DOCUMENTS

WO    WO 2017/011563 A1    1/2017

OTHER PUBLICATIONS

Misener et al ("Onboard Monitoring and Reporting for Commercial Motor Vehicle Safety Final Report", Department of Transportation Federal Motor Carrier Safety Administration, FMCSA-RRT-07-030, Dec. 2007, pp. 1-203) (Year: 2007).*
Emily Xavier ("Safety Performance Prediction of Large-Truck Drivers in the Transportation Industry", Dissertation, University of Arkansas, Dec. 2016, pp. 1-55) (Year: 2016).*

(Continued)

*Primary Examiner* — Miranda M Huang
*Assistant Examiner* — Robert Lewis Kulp
(74) *Attorney, Agent, or Firm* — ArentFox Schiff LLP (57) ABSTRACT

The described features of the present disclosure generally relate to one or more improved systems for analyzing the electronic information associated with driving activities (e.g., driver log information) obtained from the one or more mobile computing platforms (ELDs) associated with one or more vehicles to identify a likelihood of a driver resigning or deserting his or her position. Accordingly, features of the present disclosure may identify "at-risk" drivers for the fleet operators to trigger remedial measures to prevent such adverse event (e.g., driver quitting).

17 Claims, 6 Drawing Sheets

(56) References Cited

OTHER PUBLICATIONS

Shaw et al ("Alternative Conceptualizations of the Relationship Between Voluntary Turnover and Organizational Performance", Academy of Management Journal, 2005, vol. 48, No. 1, pp. 50-68) (Year: 2005).*

Martin et al ("Non-standard work schedules and retention in the entry-level hourly workforce", Journal of Occupational and Organizational Psychology (2012), 85, pp. 1-22), (Year: 2012).*

Crum et al. ("Motor Carrier Scheduling Practices and Their Influence on Driver Fatigue", Iowa State University, FMCSA, Oct. 2002, pp. 1-222) (Year: 2002).*

FleetRisk Advisors (http://www.fleetriskadvisors.com/coverviewhow-we-do-it, archive.org, snapshot Sep. 1, 2013, pp. 1-2) (Year: 2013).*

Max Heine ("Making The Case: Predictive analytics promises major improvements in safety, retention", Commercial Carrier Journal, Jun. 2014, pp. 52-58 (Year: 2014).*

Greene et al. U.S. Appl. No. 62/346,796, filed Jan. 7, 2016 (Year: 2016).*

Laura Farrell ("Assessing Daily Driving and Working Hours Within the Context of Hours-of-Service Regulations", 17th International Conference Road Safety On Five Continents (RS5C 2016), May 2016, pp. 1-13) (Year: 2016).*

Bousonville et al. ("A comparison of reward systems for truck drivers based on telematics data and driver behavior assessments", Schriftenreihe Logistik der Fakultat fur Wirtschaftswissenschaften,, Saarland University of Applied Sciences, No. 8, 2015) (Year: 2015).*

International Search Report and Written Opinion issued in PCT/US2018/013397 dated May 17, 2018.

Extended European Search Report issued for European Application No. 18741678.9 dated Oct. 6, 2020.

Canadian Office Action issued in corresponding Canadian Application No. 3,048,651 dated Jul. 5, 2022.

* cited by examiner

DRIVER LOG RETENTION SYSTEM

BACKGROUND

Nearly every good consumed by households and businesses, at some point, is transported on a truck. The vast majority of communities rely on trucks to routinely deliver all of their essential products necessary for basic existence. With the trucking industry being soundly intertwined with the country's economy, it is necessary for fleet operators to find, recruit, and retain qualified drivers for each truck on the road. Unfortunately, driver turnover and retention problems have been such a dilemma that the condition has become an accepted obstacle and is considered a natural cost of business.

Fleet operators have attempted to curb the driver turnover problem by increasing compensation for their drivers. However, in many instances, work satisfaction for drivers may not necessarily be driven by pay alone, but instead may include a combination of factors (e.g., benefits, work-life balance, professional development opportunities, etc.) that may be unique to each driver. Moreover, factors that may be important to each driver may dynamically vary over time based on changing circumstances. For example, while work-life balance may not be as important to a driver initially, the driver's desire to be home more often may increase after long stretches of being on the road. Conventional systems of identifying what may or may not be important to a driver are generally limited to periodic surveys that may be conducted for company-wide improvements that may not be flexibly adapted for each individual driver. Furthermore, such systems may be ill equipped to handle real-time changes to circumstances that may affect an individual driver's perception of work satisfaction and contribute to a driver retention issues.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The described features of the present disclosure generally relate to one or more improved systems, methods, and/or devices for analyzing the electronic information associated with driving activities (e.g., driver log information) obtained from the one or more electronic logging device (ELD) or mobile computing platforms (MCPs) associated with one or more vehicles to identify a likelihood of a driver resigning or deserting his or her position in a subsequent time period. Accordingly, features of the present disclosure may identify "at-risk" drivers for the fleet operators to trigger remedial measures to prevent such adverse event (e.g., driver quitting). In some aspects, remedial measures may include the driver turnover prediction module transmitting the predictive results to a scheduling engine that automatically modifies the schedule of "at-risk" drivers.

Thus, in accordance with aspects of the present disclosure, a method and system of predicting at-risk drivers based on driver log information is disclosed. In an example, a network entity may periodically receive driver log information associated with one or more drivers respectively corresponding to one or more vehicles. The network entity may aggregate the driver log information for a predetermined time period, and transform the aggregated driver log information into a set of derivations derived from the aggregated driver log information for each of the one or more drivers in accordance with one or more derivation rules associated with a turnover prediction model to predict likelihood of a driver resigning or deserting the fleet by generating a prediction report that identifies a risk of one or more drivers resigning. Additionally, the network entity may transmit a notification message including one or more of the driver retention predictions, such as to a user of the system, (e.g., a fleet operator).

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

As discussed above, driver turnover and retention problems have been a significant issue in the trucking industry. To curb the retention problems, present disclosure provides techniques for analyzing extremely detailed and extremely voluminous electronic information associated with driving activities (e.g., driver log information) obtained from the one or more electronic logging devices (ELD) associated with one or more vehicles to identify a likelihood of a driver resigning or deserting his or her position in the foreseeable future. One example of an ELD may be Intelligent Vehicle Gateway (IVG) by Omnitracs Inc. or any mobile computing platform capable of tracking hours of service data."

Particularly, in accordance with government regulations, drivers are required to maintain accurate record of their driving activities (e.g., how much and how often a truck driver may drive). To this end, electronic logging systems for tracking, managing and maintaining driver log information for a fleet of portable assets have been developed. These electronic logging systems may assist a fleet operator and/or truck driver to accurately maintain driver logs that may identify, for example, time periods when the driver is on-duty and driving, on-duty but not driving, off-duty, and resting/sleeping, referred to herein as driver log information. In some aspects, ELD devices located in a cab and/or trailer of a vehicle transporting a portable asset may aid the truck driver in managing the driver log information. In some examples, the ELD device may offer a user interface to the truck driver to allow the truck driver to enter and/or track the required driver log information to record the driver activity. Additionally or alternatively, the ELD device may automatically measure or determine at least a portion of the driver log information (e.g., on-duty and driving, on-duty but not driving, off-duty, and resting/sleeping), for example, based on an initial driver entered indication and maintaining a timer, and/or based on a number of sensors that collect and report vehicle performance data to the ELD. Additionally, the ELD may communicate the collected driver log information to the NMC for further analysis.

Aspects of the present disclosure leverage the collected, voluminous driver log information in a new, efficient manner to identify drivers that may be at an elevated risk of resigning or deserting the fleet. In particular, the present disclosure includes a driver turnover prediction model having one or more derivation rules that transform the voluminous driver log information into a smaller set of new information, referred to as derivations, that are based on individual ones and/or specific sets of the driver log information. As such, the derivations are more efficient for a computer to process. Moreover, the derivation rules are specifically configured to generate derivations that are statistically significant predictors associated with retention conditions that flag one or more drivers that exhibit characteristics or behavior of a driver that is close to resigning. As such, not only are the derivations more efficient for processing, but they are also more efficient for predicting an outcome associated with a driver that is about to resign, as compared to the original, voluminous set of driver log information.

For example, if the collected driver log information indicates that a driver over a predetermined period of time has diverged from his or her average start "on-duty" time (e.g., time that the driver normally starts his or her shift) in excess of a threshold (e.g., if the driver, on average, starts working every day at 9:00 am, but over the course of last week has diverged from that start time by more than 1 hour (e.g., 7:00 am and/or 10:30 am)), the sudden shift variance may trigger a flag that the driver is likely on the verge of resigning. Similarly, if the collected driver log information over a predetermined time period (e.g., one week) indicates a steep decline in "on-duty and driving" hours from the driver's average number of hours based on driver's historical information, the driver turnover prediction model may operably predict likelihood of a driver resigning or deserting the fleet. In some examples, the driver turnover prediction model may be based on analyses of historical data across a large number of drivers to identify factors that are common for drivers that subsequently resign. The driver turnover prediction model is then applied to each active driver in a fleet on a periodic basis, for example on a weekly basis, to monitor whether any of the factors identified in the driver turnover prediction model apply to any of the drivers such that preventive measures may be taken before the driver resigns.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
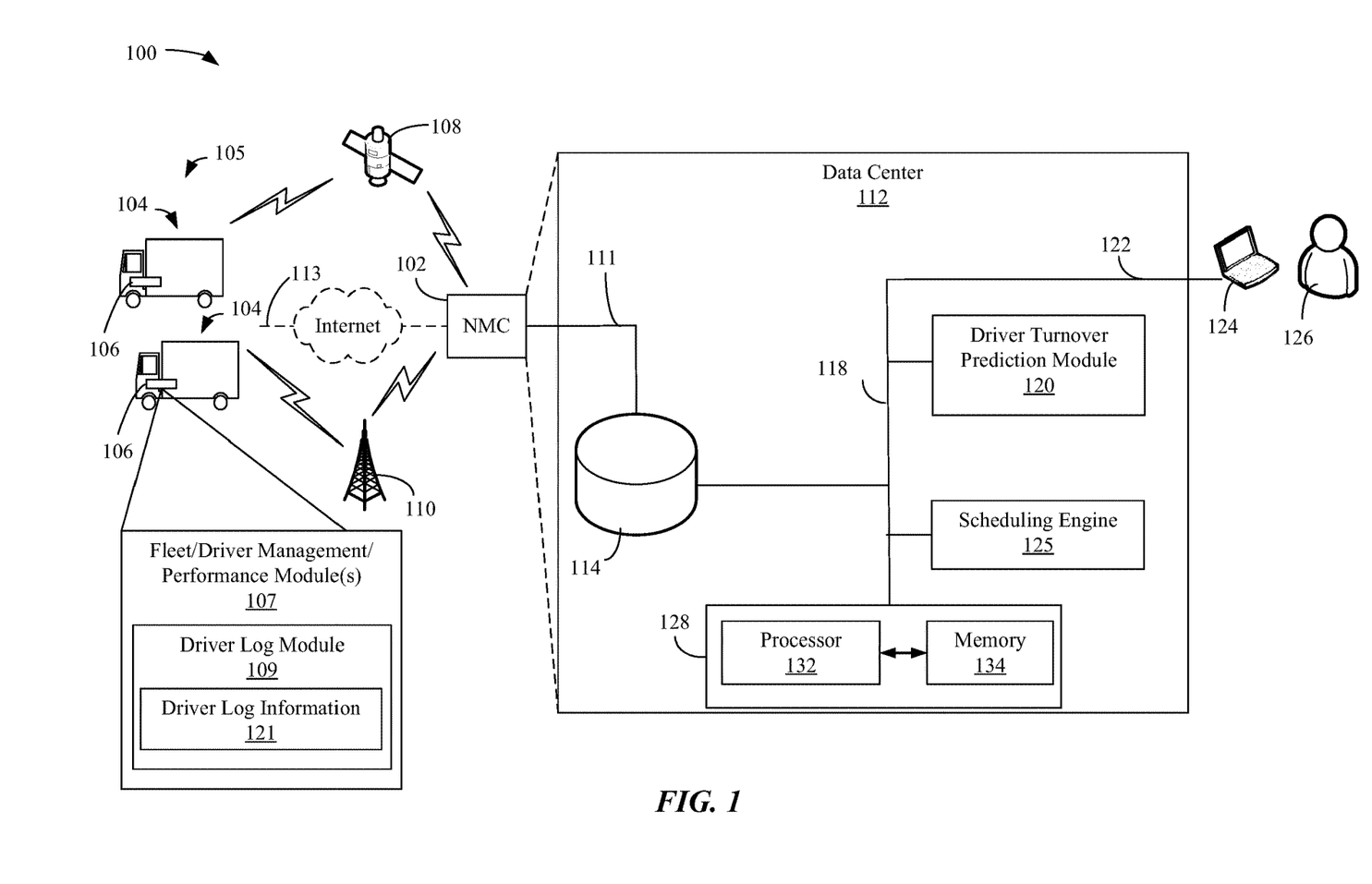
FIG. 1 is a schematic block diagram of example elements of an aspect of a system including a driver turnover prediction module for predicting drivers that are likely to resign based on driver log information collected by a respective driver log module of a respective electronic logging device (ELD) associated with each vehicle or each driver.

Referring to FIG. 1, in an aspect, a system 100 includes modules for collecting, analyzing and presenting fleet and/or driver management or performance data, including a driver turnover prediction module 120 that can notify a fleet operator of drivers that may be at-risk of resigning based on the driver log information 121 received from one or more driver log modules 109 associated with one or more vehicles 104. The identification of at-risk drivers may initiate remedial measures to avoid such adverse event. In some aspects, remedial measures may include the driver turnover prediction module 120 transmitting the predictive results to a scheduling engine 125 that automatically modifies the schedule of "at-risk" drivers. As used herein, the terms "module(s)" may be one of the parts that make up a device, may be hardware or software or firmware, and may be divided into other modules and/or distributed across one or more processors.

In an aspect, system 100 can comprise a network management center (NMC) 102 configured to communicate with one or more vehicles 104 via a ELD 106 located on each vehicle 104 or associated with each driver of each vehicle 104. The system 100 may include one or more fleets of vehicles 104, each fleet having at least one vehicle. Typically, a fleet could include many tens, hundreds or thousands of vehicles. An example fleet 105 is illustrated as having two vehicles 104. Additional fleets (not shown) are contemplated, but not shown. In implementations, each ELD 106 is configured to collect and transmit data associated with the driver and/or the operation of the vehicle 104 to the NMC 102. Also, in some implementations, ELD 106 can be configured to perform calculations associated with one or more fleet and/or driver management or performance module(s) 107 using any of the collected data. In an aspect, fleet and/or driver management or performance module(s) 107 may be implemented as a software application defined by code or instructions stored in a computer-readable medium and executed by a processor, and/or as hardware (e.g., a specially programmed processor module), and/or as firmware. According to the present aspects, one of the fleet and/or driver management or performance module(s) 107 may include driver log module 109, also referred to as an "Hours of Service module," which is configured to collect and report driver log information 121 to NMC 102, as will be discussed in more detail below.

In some implementations, ELD 106 may include a processor configured to execute one or more fleet and/or driver management or performance modules 107 one or more transceivers to perform associated communications with external devices such as NMC 102 via a communication network, and a memory configured to store computer-readable code that may define all or part of the modules 107 and also to store data associated with the components 107 and/or ELD 106. ELD 106 may also include a user interface or display, a mobile application server, and a communications module (e.g., including the one or more transceivers, and one or more of terrestrial and Wi-Fi modems, one or more antennae, a GPS module, and a satellite communications module). For example, in an aspect, ELD 106 may include, but is not limited to, ELD the Intelligent Vehicle Gateway (IVG) platform sold by OMNITRACS LLC of Dallas, Texas, which may include fleet and/or driver management or performance modules 107 such as, but not limited to, a driver log module 109 (also referred to as an Hours of Service module), an Analytics Manager module, a Critical Event Reporting module, a Driver Workflow module, an Extended Productivity Suite module, a Fault Monitoring module, an In-Cab Navigation module, an In-Cab Scanning module, an In-Cab Video Training module, a Media Manager module, a Performance Monitoring module with a Fuel Manager module, a Predictive Performance Service module, a Trip Manager module, a Vehicle Maintenance and Inspection Reporting module, and a Web Browsing module.

As an example only, each vehicle 104 may be in bi-directional communication with NMC 102 over at least one communication channel. In the example shown in FIG. 1, each vehicle 104 is in bi-directional communication with the NMC 102 over at least one of a satellite-based communication system 108 and a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 113 through the Internet). Depending on many factors, data may be exchanged with the vehicles 104 using one or both of the satellite communication system 108 and the terrestrial-based communication system 110.

In an aspect, many different types of data are collected and transferred from the vehicles 104 to the NMC 102. Examples of such data include, but are not limited to, driver performance data, driver duty status such as driver log information 121, truck performance data, critical events, messaging and position data, location delivery data, and many other types of data. As noted, the data associated with the operation of the vehicle 104 may further include driver log information 121 collected by the driver log module 109. In some examples, the driver log module 109 may employ the user interface or display of the ELD 106 to allow a truck driver, for example, to enter relevant driver log information 121 (e.g., on-duty and driving, on-duty but not driving, off-duty, resting/sleeping, etc.) for one or more sampled time points into the ELD 106. For instance, the driver may provide an entry upon a change in driver log information 121 (e.g., a change in a driver state from one to another of on-duty and driving, on-duty but not driving, off-duty, resting/sleeping, etc.), and driver log module 109 may include a timer that maintains a history of how long the driver was in each driver state. For instance, in one example that should not be construed as limiting, each driver state recorded in the driver log information 121 may be represented by a log code (e.g., code having a value of: 1=off duty, 2=sleeping, 3=driving, 4=on duty but not driving, 5=yards moved, 6=personal conveyance), and driver log module 109 may track which log code applies to the driver for each sampled time point, such as, for example, for each minute of the day. As such, in one non-limiting example, driver log module 109 may track the driver log information 121 in a manner that represents the 24 hours in a driver's day as a sequence of 1440 codes, where the sequence corresponds to some combination or sequence of different log code values (e.g., 1=off duty, 2=sleeping, 3=driving, 4=on duty but not driving, 5=yards moved, 6=personal conveyance).

All of the information that is communicated to and from the vehicles 104 is processed via the NMC 102. The NMC 102 can be thought of as a data clearinghouse that receives all data that is transmitted to and received from the vehicles 104. Moreover, in an aspect, NMC 102 may include one or more back-end servers for distributing the software update to one or more ELD(s) 106. Thus, in some aspects, the collected information (e.g., driver log information 121) may periodically (e.g., every x minutes, where x is a whole number, or once a day, or upon availability of a wired or wireless connection) be transmitted from the ELD 106 to the NMC 102 for analysis and record keeping.

The system 100 also includes a data center 112, which may be part of or in communication with NMC 102. The data center 112 illustrates one possible implementation of a central repository for all of the data received from each of the vehicles 104. As an example, as mentioned above many different types of data are transmitted from the vehicles 104 to the NMC 102. In the case where data center 112 is in communication with NMC 102, the data may be transmitted via connection 111 to the data center 112. The connection 111 may comprise any wired or wireless dedicated connection, a broadband connection, or any other communication channel configured to transport the data. Moreover, in an aspect, data center 112 may include one or more back-end servers for distributing the software update to one or more ELD(s) 106.

In an aspect, the data center 112 may include a data warehouse 114 for receiving the data from vehicles 104 relating to fleet and/or driver management or performance. In an aspect, for example, data center 112 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may include one or more servers related to driver turnover models, such as based on receiving driver log information 121 from driver log modules 109 (or, hours of service (HOS) modules). Further, for example, an application server may be a services portal (SP) server that receives, for example, messaging and positioning (M/P) data and/or location delivery efficiency (LDE) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be a fuel cost server that receives, for example, vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 112 may include additional and/or different application servers.

In an aspect, the data center 112 may include a driver turnover prediction module 120 for analyzing the data in data warehouse 114 from vehicles 104 and generating fleet and/or driver management or performance metrics. According to the present aspects, the data center 112 may include a driver turnover prediction module 120 to aid in identifying drivers that may be at risk of resigning or deserting their position with the fleet based on driver log information 121 collected from driver log module 109.

In some aspect, driver turnover prediction module 120 may implement a set of routines that define a query to send to data warehouse 114 over connection 118, and that receives data in response to the query from data warehouse 114 over connection 118. The driver turnover prediction module 120 may capture, manipulate, and provide this data in a usable format, for example, over connection 122 for output on a display or printer associated with a terminal device 124. The terminal device 124 can be a user interface portal, a web-based interface, a personal computer (PC), a laptop, a personal data assistant (PDA), a dedicated terminal, a dumb terminal, or any other device over which a user 126, such as a manager or operator responsible for monitoring a fleet 105 of vehicles 104, can view the display or receive a printed report provided by driver turnover prediction module 120. According to the present aspects, for example, the driver turnover prediction module 120 may analyze driver log information 121 and generate a report or notification of one or more at-risk drivers. The user 126 (e.g., fleet operator) may utilize the generated report or notification that identifies the at-risk driver(s) to initiate remedial measures to prevent the predicted adverse driver event (e.g., driver resigning) from coming to fruition. In some aspects, remedial measures may include the driver turnover prediction module 120 transmitting the predictive results to a scheduling engine 125 that automatically modifies the schedule of "at-risk" drivers. The scheduling engine 125 may coordinate the driver schedules and assigned routes. Based on identification of "at-risk" drivers, the scheduling engine 125 may adjust the driver's route and/or schedule to, for example, minimize the night driving hours. Additionally or alternatively, the scheduling engine 125 may also restrict the driver's schedule for certain hours based on identification of one or more predictive parameters that exceed a threshold. For example, if the driver turnover prediction module 120 identifies "at-risk" driver based on an observation that a driver's night hours are exceeding a threshold (while other predictive variables are 'normal'), the scheduling engine 125 may alter the driver's schedule such that he is restricted from driving at night, and thereby reducing the occurrence of predictive variable that flags "at-risk" drivers.

In an aspect, driver turnover prediction module 120 may be an analysis engine defined by or operating via a processing system 128, for example, connected via a system bus 130. In an aspect, the processing system 128 includes a processor 132 and a memory 134. In an example implementation, the functionality of driver turnover prediction module 120 as described herein may be implemented in one or more hardware or firmware processor modules of processor 132. For instance, although illustrated as being separate components, driver turnover prediction module 120 and driver scoring 123 may be a part of or in communication with processor 132. In another example implementation, the memory 134 can store the routines or functionality, e.g., in the form of computer-readable code or instructions, and/or the corresponding data, that are associated with driver turnover prediction module 120. In an aspect, the processor 132 can execute the stored routines (e.g., code) to implement the functionality of driver turnover prediction module 120 that are described herein. Although shown as residing within the data center 112, the processing system 128 may reside elsewhere, and may be implemented as a distributed system in which the processor 132 and the memory 134 may include one or more processor and memories, and may be located in different places, such as at NMC 102 and/or one or more servers associated with NMC 102 or data center 112.

It should be noted that the example implementation illustrated in FIG. 1 should not be construed as limiting, as one of skill in the art may modify this implementation and achieve similar results. For instance, rather than the illustrated modules and described functionality for generating predicted adverse driver event 123 operating remotely from ELD 106, e.g., at NMC 102 and/or data center 112, the functionality described herein may instead be implemented directly on ELD 106, which may then directly output adverse driver event prediction(s) 123, e.g., to the driver of vehicle 104 and/or to user 126 (e.g., operator of fleet 105 of vehicles 104) or a manager of system 100, such as a company like OMNITRACS, LLC of Dallas, TX.

Figure 2:
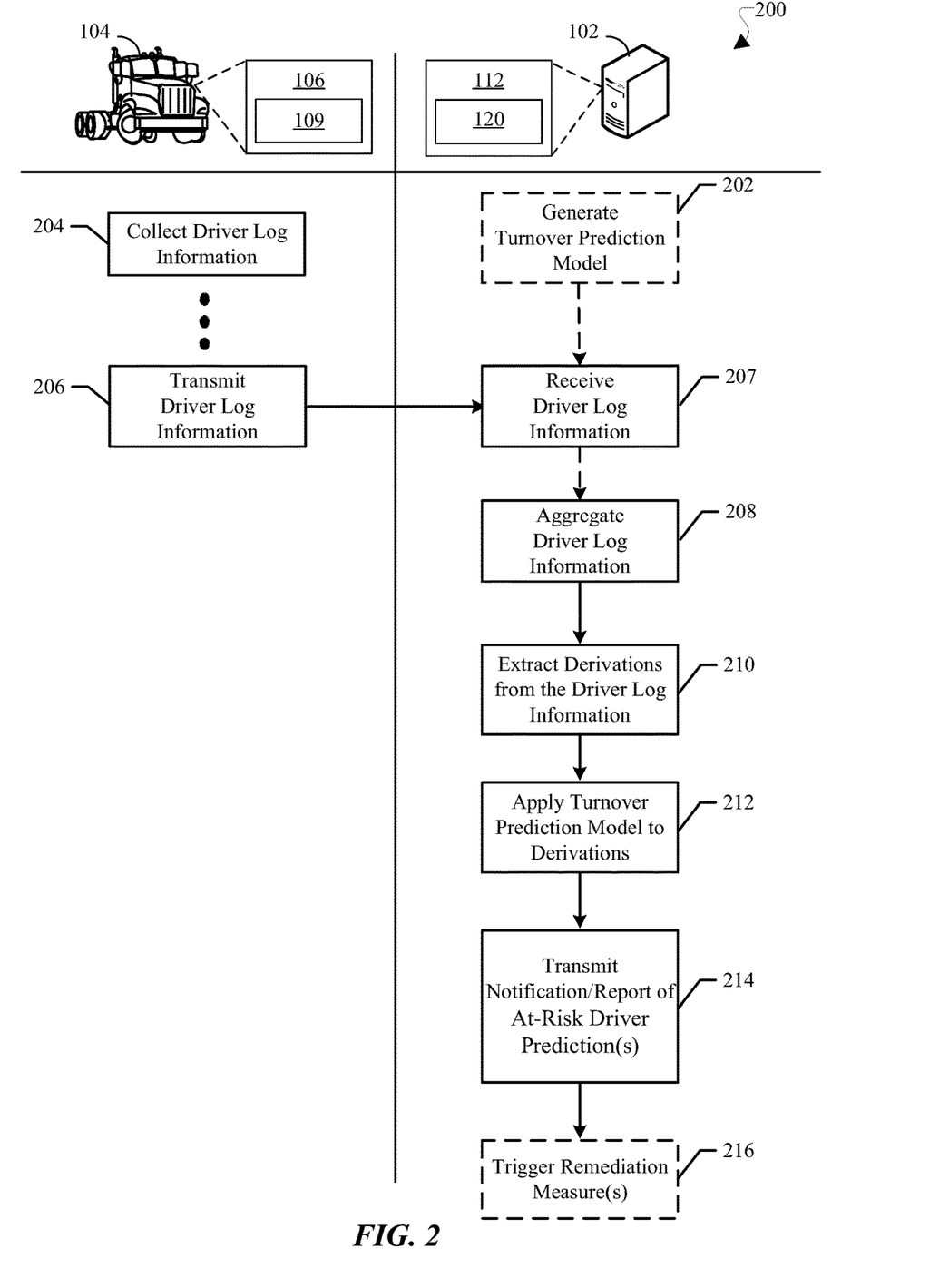
FIG. 2 is a flowchart of an aspect of a method of notification of a predicted at-risk drivers in accordance with the present disclosure.
Figure 3:
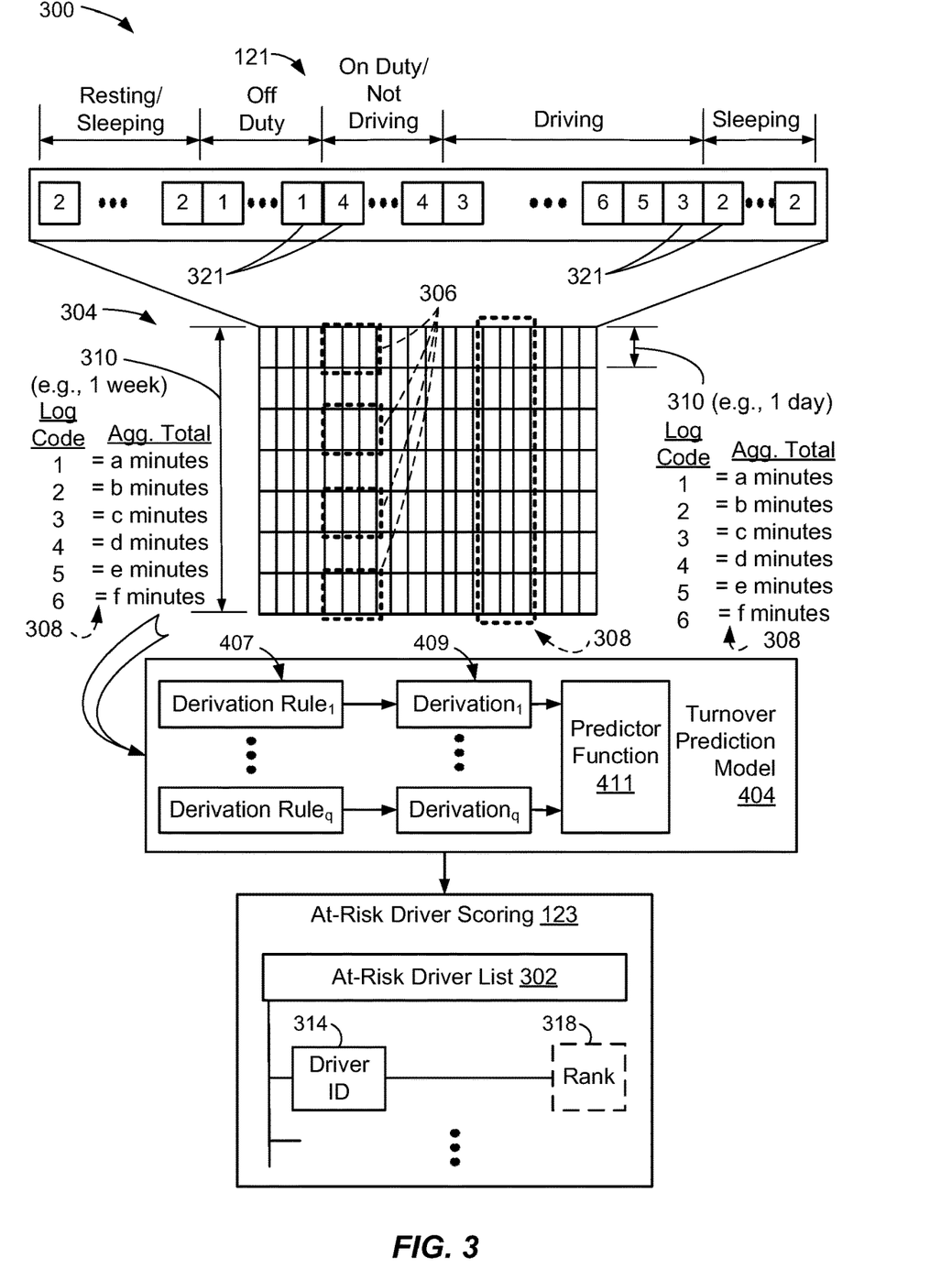
FIG. 3 is a schematic diagram of one example of the collection and aggregation of the driver log information, and the subsequent operation of a turnover prediction model to determine one or more derivations from the collected and aggregated driver log information, resulting in generation of a report that identifies one or more at-risk drivers in accordance with the present disclosure.
Figure 4:
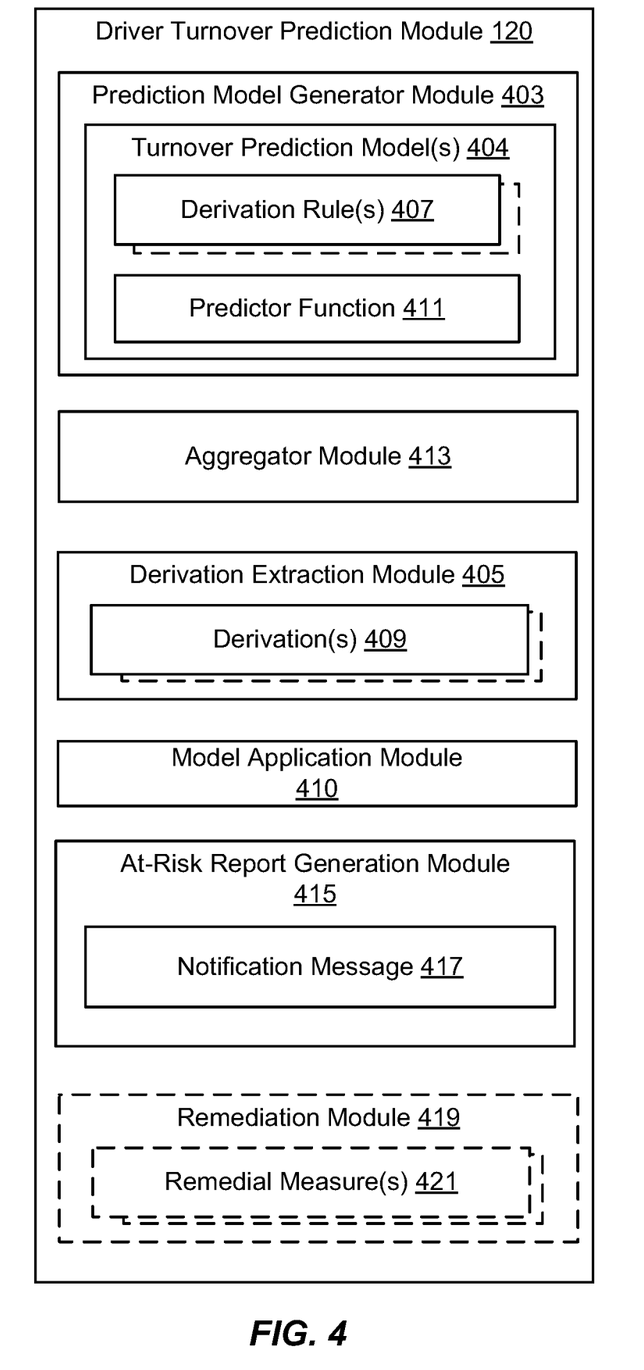
FIG. 4 is a block diagram of an aspect of the sub-modules of the driver turnover prediction module of FIG. 1 in accordance with the present disclosure.

Referring to FIGS. 2-4, an example of one implementation of a method 200 for analyzing driver log information 121 and identifying one or more at-risk drivers (e.g., drivers that are likely to resign in a subsequent time period) in accordance with the present disclosure includes an interaction between the NMC 102 and at least one designated ELD 106 associated with at least one vehicle 104 and at least one driver. In some aspects, the ELD(s) 106 may include driver log module 109 for collecting driver log information 121. Although the illustrated example shows the interaction between the driver turnover prediction module 120 and the ELD 106, it should be understood that the driver turnover prediction module 120 is not limited to receiving the driver log information 121 from the ELD 106 exclusively. As discussed above, and referring for example to FIG. 3, one example of driver log information 121 includes a combination or sequence of log codes 321, where the value of each log code 321 represents a driver state (e.g., log code 321 having a value of: 1=off duty, 2=sleeping, 3=driving, 4=on duty but not driving, 5=yards moved, 6=personal conveyance) for an amount of time associated with each log code 321 (e.g., 1 log code/minute). So, for example, driver log module 109 may track which log code 321 applies to the driver for, for example, each minute of the day. As such, in one non-limiting example, driver log module 109 may track the driver log information 121 in a manner that represents the 24 hours in a driver's day as a sequence of 1440 log codes (60 log codes/minute×1 minute/hour×24 hours/day), where the sequence corresponds to some combination or sequence of different log code values.

As mentioned above, the NMC 102 may include or be associated with data center 112. The data center 112, in some examples, may further include driver turnover prediction module 120, which is configured to identify at-risk drivers based on driver log information 121. It should be noted that this example implementation should not be construed as limiting, as one of skill in the art may modify this implementation and achieve similar results. For instance, rather than the illustrated actions of method 200 occurring at NMC 102, the functionality associated with driver turnover prediction module 120 may instead be implemented on a web portal or directly on ELD 106, which may then directly output at-risk driver scoring 123, e.g., to user 126 (operator of fleet 105). Additionally, method 200 of FIG. 2 is discussed with further reference to FIG. 3, which includes a representation of the collected driver log information 121 and the corresponding processing described herein to arrive at adverse driver event prediction(s) 123, and to FIG. 4, which includes a more detailed architectural implementation of driver turnover prediction module 120.

In accordance with various aspects of the present disclosure, at 202, the method 200 optionally may include generating a turnover prediction model.

For example, in an aspect that refers to FIG. 3 and FIG. 4, driver turnover prediction module 120 may include a prediction model generator module 403 configured to generate or modify one or more turnover prediction models 404 each configured to identify drivers at-risk of resigning based on driver log information 121. At-risk driver list 302, as used herein, may include identification of drivers or employees that are likely to resign based on observed correlation in the driver log information 121 of the one or more drivers against historical data across the entire fleet. The contributing factors that identify at-risk drivers may be configurable, and thus may vary from operator to operator and fleet to fleet. It should be noted that, in some cases, one or more turnover prediction models 404 may already exist and may not need to be modified or otherwise updated, e.g., based on recent feedback, and as such, the action at 202 of generating turnover prediction model 404 may not be implemented.

In an aspect where the turnover prediction model 404 is to be generated or modified, prediction model generation module 403 may generate and/or dynamically adjust the respective turnover prediction model 404 based on an in-depth analysis of historical data (e.g., historical driver log information, such as the collection of the log codes 321 (e.g., log code value 1, log code value 2, log code value 3, log code value 4, log code value 5, and log code value 6) associated with a corresponding historical adverse driver event 302). In particular, the analysis identifies one or more derivation rules 407 for one or more derivations 409, e.g., parameters derived from some subset of the historical driver log information, that are found to have sufficient correlation to contribute to predicting at-risk drivers. For example, although the generation or modification of turnover prediction model 404 may initially consider a very high number of derivations 409, e.g., such as over 1000 derivations, the final turnover prediction model 404 may only include a fraction of such initially considered derivations based on analysis of the historical driver log information. As such, the one or more derivations 409 may also be referred to as predictor variables for identification of at-risk driver. For example, but not limited hereto, prediction model generation module 403 may include or utilize one or more of a regression model, a neural network, a non-linear curve fitting model, correlation coefficients, path analysis, structural equation modeling, principal component analysis, genetic algorithms, analysis of variance, or any other type of predictive modeling to analyze and/or derive turnover prediction model 404 from historical driver log information for predicting a corresponding historical at-risk driver based on the historical driver log information. In some examples, the subset of parameters or predictor variables that may contribute to generation of one or more derivation rules 407 may be assigned variable weight(s) to accurately correlate the driving habits of a driver based on the driver log information against the historical significant dataset. Table 1 below reflects one non-limiting example of the predictor variables that contribute to the derivation rules 407 and corresponding weights applied to each parameter.

TABLE 1

| Predictor Variables | Weight |
|---|---|
| Driving Hours Per Week | 10.89% |
| Day Sleep Opportunity | 6.96% |
| Shift Start Variance | 6.18% |
| On-Duty Not Driving 04 | 6.08% |
| Number of Early Shift Starts | 5.94% |
| On-Duty Not Driving 02 | 5.36% |
| On-Duty Not Driving 07 | 4.95% |
| Total Violations | 4.93% |
| On-Duty Not Driving 05 | 4.88% |
| On-Duty Not Driving 01 | 4.47% |
| No 8 Hours Off in 24 Hours Violation | 4.40% |
| Off Duty 23 | 4.29% |
| On Duty Hours Per Week | 4.21% |
| Number of Late Shift Starts | 4.18% |
| On-Duty Not Driving 23 | 4.11% |
| Shifts Exceeds Overlapping 12 Hours On-Duty Violation | 4.06% |
| More Than 3 Hours On-Duty Not Driving in 24 Hours | 3.82% |
| Late Night Driving | 3.61% |
| Sleeper 01 | 3.55% |
| On-Duty Not Driving 19 | 3.13% |

Identification of one or more above-identified parameters may be based on analysis of collection of the log codes 321 (e.g., log code value 1, log code value 2, log code value 3, log code value 4, log code value 5, and log code value 6) received periodically from the ELD 106 in the driver log information 121. In some examples, the "Driving Hours Per Week" variable may identify the number of hours/minutes that a driver has been On-Duty and driving over the course of a predetermined time period (e.g., one week). The "On Duty Hours Per week" variable may identify the number of hours/minutes that the driver has been on-duty, which includes both on-duty driving hours and on-duty not driving hours. Additional parameters that formulate the derivative rules include "Late Night Driving" variable that tracks the number of hours that the driver is on-duty and driving in off-peak hours (e.g., 7:00 pm-5:00 am). The "Day Sleep Opportunity" variable may indicate the number of minutes that the driver has an opportunity to sleep during a course of the day. In some examples, the period of time (day) may be limited to between 10:00 am and 5:00 pm. The sleep opportunities may arise when the driver is Off-Duty (e.g., when the truck trailer is being loaded/unloaded). The "Shift Start Variance" variable may indicate the number of minutes that the driver, over a course of one week, has deviated from his or her average start time. For example, if the driver, based on historical data, on average starts his or her shift at 9:00 am, but over the course of one week has deviated significantly (e.g., exceeded a threshold of one hour), the "Shift Start Variance" variable may capture the deviation in consideration of the driver turnover prediction module 120 and identification of at-risk drivers 302. The start variance may be further subdivided into "Number of Early Shift Starts" and "Number of Late Shift Starts" variables that determine whether the deviation from normal starting hours is towards an earlier start or later start times. Further, the "More Than 3 Hours On-Duty Not Driving in 24 Hours" parameter may track the number of instances that the driver has been on-duty, but not driving in a 24 hour period.

The "On-Duty Not Driving 04" variable may identify the number of minutes that a driver is On-Duty, but not driving between the hours of 3:00 am and 4:00 am. Similarly, "On-Duty Not Driving 02" variable may identify the number of minutes that the driver is On-Duty, but not driving between the hours of 1:00 am and 2:00 am. The "On-Duty Not Driving 07" variable may identify the number of minutes that a driver is On-Duty, but not driving between the hours of 6:00 am and 7:00 am. The "On-Duty Not Driving 05" variable may identify the number of minutes that a driver is On-Duty, but not driving between the hours of 4:00 am and 5:00 am. The "On-Duty Not Driving 01" variable may identify the number of minutes that a driver is On-Duty, but not driving between the hours of 12:00 am and 1:00 am. The "On-Duty Not Driving 23" variable may identify the number of minutes that a driver is On-Duty, but not driving between the hours of 10:00 pm and 11:00 pm. Finally, the "On-Duty Not Driving 19" variable may identify the number of minutes that a driver is On-Duty, but not driving between the hours of 6:00 pm and 7:00 pm. Conversely, "Off-Duty 23" variable may indicate the number of minutes that the driver was off-duty between the hours of 10:00 pm and 11:00 pm. The "Sleeper01" variable may indicate the number of minutes that the driver had an opportunity to sleep during the hours of 12:00 am and 1:00 am.

Continuing with the parameters in Table 1, the "Total Violations" variable may identify the number of hours of service government mandated regulations have been breached over the course of one week. For example, if over the course of one week, the driver has been On-Duty and driving in excess of limitations imposed by the government and/or has driver for more than 12 hours in a day, each of the violations may be maintained by the "Total Violations" variable. Additional violations may include "No 8 Hours Off in 24 Hours Violation" that is flagged when the driver has not had an opportunity to rest for at least 8 hours during a 24 hour period and the "Shift Exceeds Overlapping 12 Hours On-Duty Violation" that is flagged when the driver is on-duty over the course of two days with overlapping shifts. In some examples, the one or more predictor variables may be government mandated variables (e.g., driving hours per week), while others are selectively identified by features of the present disclosure (e.g., day sleep opportunity, night driving hours, etc.) as variables that may be key prediction indicators.

Further, for example, the one or more derivation rules 407 may include a function or equation to be applied to one or more portions of a set 304 of driver log information 121 collected for a predetermined time period 310 in order to define the one or more derivations 409. The set 304 may include collected driver log information 321 over a first predetermined time period (e.g., a week), while the derivation rules 407 may apply to one or more different time periods or subsets within set 304, including to one or more individual subsets 306 of one or more log codes 321 corresponding to selected time periods in set 304, as well as to one or more different aggregated subsets 308 of set 304. For instance, the one or more individual subsets 306 may include, as illustrated but not limited thereto, a subset of log codes 321 from a same time period during one or more different days of a week, and the one or more aggregated subsets 308 may include an aggregation such as a summation of the log codes over a time period (e.g., as illustrated but not limited thereto, a daily summation of log codes 1, 2, 3, 4, 5, and 6, which respectively total a, b, c, and d minutes, or, e.g., a weekly summation of log codes 1, 2, 3, and 4, which respectively total w, x, y, and z minutes, where a, b, c, d, and w, x, y, and z may be whole numbers). Additionally, the function applied as part of each derivation rule 407 may be an identity function, e.g., where the value of log code 321 is recorded, or the function may be any mathematical function, such as an average, mean, sum, standard deviation, comparison or difference, etc. In a simple example of a representative derivation rule 409, a representative derivation 409 or predictor variable may be defined as a sum of the aggregated subset 308 of a number of minutes (or hours) in a day or a week for when a driver is sleeping or driving (e.g., a sum of the aggregated total of log code 2 or log code 3 for one day or one week). In another example, the one or more derivation rules 407 may define one or more derivations 409, or predictor variables, such as a mean or standard deviation of the aggregated subset 308 of a number of minutes (or hours) per week in one month, for whether a driver is sleeping or driving (e.g., a mean or standard deviation of the aggregated total of log code 2 or log code 3 for each week in a month). Other more complicated derivation rules 407 may quantify the occurrence of certain derivations 409 that can be defined by the set 304 of driver log information 321 in certain time periods, or certain combinations of derivations 409 that can be defined in certain time periods, or the absence of certain derivations 409 in a certain time period, or any combination thereof. In other words, derivations rules 407 may define derivations 409 such as, but not limited to the parameters identified in Table 1 above. In some aspects, the aggregate data table may include over 1,000 various parameters derived by the driver log module 109.

Moreover, as mentioned above, each turnover prediction model 404 includes a specific set of one or more derivation rules 407 and one or more derivations 409 that are specific to each driver that is scored from set 304 of driver log information 121. For example, for identification of at-risk drivers, derivation rules 407 may define derivations 409 that identify, in a certain past time period, indicators such as number of HOS regulation violations and whether the driver is on a consistent schedule. For instance, such indicators may include derivations 409 that relate to one or more predictors, such as, but not limited to: whether a driver is on duty but not driving during certain hours of the day, such as during times during normal business hours when you would expect them to be driving, as well as during times outside of normal business hours when you would expect them to be off duty; whether a driver is driving for extended time periods; whether a driver is getting sleep during certain hours of a day; whether a driver has a threshold number of HOS regulation violations in a given time period, and other similar derivations 409.

Thus, based on a respective specific set of one or more derivation rules 407 and one or more derivations 409 that are formulated for a specific adverse driver event 302, each turnover prediction model 404 may be applied to each set 304 of driver log information 121 to identify one or more at-risk drivers that are likely to resign.

In order to identify one or more at-risk drivers, based on analysis of the one or more derivation rules 407 and derivations 409, the turnover prediction model 404 may further include a predictor function 411 that may operate to assign variable weight(s) to each of the one or more derivations 409 for use in an equation to generate adverse driving event prediction(s) for one or more drivers. One example of the weight(s) that may be applied to each of the one or more derivations 409 are identified in Table 1 above. For example, total number of driving hours per week may be assigned a higher weight than the on-duty, but not driving hours. Accordingly, operation of event prediction model 404 using current driver log information 121 collected from one or more ELDs 106 may predict the likelihood of the driver resigning based on the driver log information.

It should be noted that, in one or more implementations, turnover prediction model 404 may generate predicted at-risk driver list 302 solely based on a set of driver log information 121, and the corresponding derivations 409 based on sampling of and/or aggregations of the driver log information 121, without any additional factors. Accordingly, in these aspects, turnover prediction model 404 provides a powerful prediction tool based on a relatively simple and limited set of data.

At 204, method 200 may include collecting driver log information corresponding to one or more drivers of one or more vehicles. For example, in an aspect referring back to FIG. 1, driver log module 109 may periodically collect driver log information 121 associated with one or more drivers of one or more vehicles 104. In some aspects, for example, the driver log module 109 may execute code to generate a graphical user interface or other user input interface on a user interface, e.g., a display, of ELD 106, where the graphical user interface may be operable to receive an indication of driver log information 121 via manual inputs by the truck driver or via automatic collection based on the various sensors, or some combination of both. For instance, driver log module 109 may collect the driver log information 121 corresponding to a respective driver (e.g., a driver may log in or may provide an identifier to identify him/her self) once every minute based on a manual input by the truck driver of a current driver state (e.g., a log code, such as a code corresponding to "off duty," "sleeping/resting," "driving," and "on duty but not driving") at the user interface of the ELD 106. Further, in some aspects, driver log module 109 may maintain a clock or timer that tracks a time period associated with a current driver state (e.g., previously received log code) until receiving another manual input from the truck driver to change the current driver state. For example, when a log code corresponding to "off duty" is received, then driver log module 109 can record a log code of "off duty" at that point in time and for every subsequent minute (or other periodic time of interest) until a different driver state is received. In particular, the driver log information 121 associated with the corresponding driver may include, for example, log code 321 having a variable value that indicates the driver state. As mentioned above, one example of the various values and driver states associated with log code 321 may include, but is not limited to, a value of 1 to represent "off duty," a value of 2 to represent "sleeping/resting," a value of 3 to represent "driving," a value of 4 to represent "on duty but not driving," a value of 5 may represent "yards moved," and a value of 6 may represent "personal conveyance."

At 206, method 200 may include transmitting the collected driver log information to another device for analysis. For example, in an aspect, the ELD 106 and/or driver log module 109 may transmit the driver log information 121 to the NMC 102. In some examples, driver log module 109 may periodically (e.g., every x minutes, where x is a whole number, or once a day, or upon availability of a wired or wireless connection) transmit the driver log information 121 to the NMC 102. For instance, the driver log information 121 may be transmitted from the ELD 106 to the NMC 102 using the communications component 515 (see FIG. 5), e.g., a transceiver or modem, associated with ELD 106 over at least one communication channel (e.g., via satellite-based communication system 108 and a terrestrial-based system 110). Further, for example referring to FIG. 3, the transmitted driver log information 121 may include some sequence of driver log codes 321 for each driver corresponding to a respective vehicle 104, wherein the "sequence" of driver log codes 321 may represent a driver state over some period of time (e.g., which may depend on the frequency of uploading of driver log information 121 by ELD 106 (FIG. 1)). As such, the transmitted driver log information 121 may represent some portion of the set 304 (FIG. 3) of driver log information 121 collected for a predetermined time period 306 (FIG. 3), which may be aggregated into one or more subsets 308 (FIG. 3), to which turnover prediction model 404 is applied to define the one or more derivations 409. Alternatively, or in addition, in some examples, ELD 106 may perform at least some part of the aggregating of driver log information 121 into one or more subsets 308 (FIG. 3). Accordingly, in such alternative or additional cases, the transmitted driver log information 121 may include a sequence of driver log codes 321 and additionally some aggregated subsets 308 of driver log information 121 as compiled by the driver log module 109 associated with the ELD 106.

At 207, the method 200 may include receiving the driver log information associated with one or more drivers respectively corresponding to one or more vehicles. In an aspect, for example, the NMC 102 and/or driver turnover prediction module 120 may receive the driver log information 121 associated with one or more drivers respectively corresponding to one or more vehicles 104. For instance, referring to FIGS. 1 and 6, driver log information 121 may be received via at least one of a satellite-based communication system 108 (FIG. 1) and a terrestrial-based system 110 (FIG. 1), such as through communications component 615 (FIG. 6), e.g., a transceiver. Moreover, for instance, the received driver log information 121 may be further communicated to driver turnover prediction module 120 via a bus or other communication link (e.g., 111, 118) within NMC 102 or data center 112, and/or between NMC 102 and data center 112. Further, for example referring to FIG. 3, the received driver log information 121 may include some sequence of driver log codes 321 for each driver corresponding to a respective vehicle 104, wherein the "sequence" of driver log codes 321 may represent a driver state over some period of time (e.g., which may depend on the frequency of uploading of driver log information by ELD 106 (FIG. 1)). As such, the received driver log information 121 may represent some portion of the set 304 (FIG. 3) of driver log information 121 collected for a predetermined time period 310 (FIG. 3), which may be aggregated into one or more subsets 308 (FIG. 3) associated with event prediction model 404 to define the one or more derivations 409. Alternatively or in addition, as mentioned above, in some examples, ELD 106 may perform at least some part of aggregating driver log information 121 into one or more subsets 308 (FIG. 3). Accordingly, in such alternative or additional cases, the received driver log information 121 may include a sequence of driver log codes 321 and additionally some aggregated subsets 308 of driver log information 121 as compiled by the driver log module 109 associated with the ELD 106.

At 208, method 200 may include aggregating the driver log information for a predetermined time period. For example, in an aspect that refers to FIGS. 3 and 4, the driver turnover prediction module 120 may include an aggregator module 413 operable to aggregate driver log information 121 into a set 304 covering a predetermined time period 310, and/or into one or more different aggregated subsets 308 of the set 304 for one or more predetermined time periods 310. In other words, the "aggregating" performed by aggregator module 413 may be collecting driver log information 121 over predetermined time period 310, or performing some mathematical function on some portion of the set 304, or some combination of both. As such, aggregator module 413 may include one or more mathematical functions for representing a certain combination of data, e.g., based on one or more derivation rules 407 associated with a respective event prediction model 404. As noted above, the one or more aggregated subsets 308 (FIG. 3) may correspond to some function of some data over different time periods or on certain days or weeks (e.g., a sum, average, mean, standard deviation of minutes or hours per log code 321 over a day or a week or a month, or from day-to-day or week-to-week, etc., or a certain function of a certain log code on one or more days within a certain time period), and/or to some portion of some equation including individual or aggregated data as defined by one or more derivation rules 407. In FIG. 3, in an example that should not be construed as limiting, different subsets 308 are illustrated that correspond to aggregated data over a day, or over a week, or within certain hours of each day of a week, or within certain hours of certain days of a week. It should be understood that the different combinations in which driver log information 121 may be aggregated from one or more portions of set 304 into one or more different aggregated subsets 308 is completely configurable depending on which combination of data one may believe to be of interest with respect to predicting a respective adverse driver event 302.

At 210, method 200 may include extracting derivations from the aggregated driver log information in accordance with one or more derivation rules associated with an turnover prediction model operable to predict the likelihood of a driver resigning in the foreseeable future. Particularly, the network entity may transform the aggregated driver log information into a set of derivations derived from the aggregated driver log information for each of the one or more drivers in accordance with one or more derivation rules associated with a turnover prediction model. For example, in an aspect that refers to FIGS. 3 and 4, the driver turnover prediction module 120 may include a derivation extraction module 405 to extract derivations 409 from the set 304 of driver log information 121, and/or from one or more different aggregated subsets 308 of the set 304, in accordance with one or more derivation rules 407 associated with a respective turnover prediction model 404 configured to predict likelihood of a driver resigning. As such, for instance, derivation extraction module 405 may include a function operable to perform the one or more derivations rules 407 on individual portions or on aggregated subsets 308 of the set 304 of collected driver log information 121. For example, in an aspect, the driver turnover prediction module 120 may process the driver log information 121 by transforming the raw data (e.g., number of hours for on-duty and driving, on-duty but not driving, off-duty, resting hours, yards moved, and personal conveyance) into one or more driver evaluation derivations 409, which may be referred to as predictor variables that provide a clearer picture of driver performance of an overall driver state. For example, based on the number of hours for on-duty and driving, on-duty but not driving, off-duty, and/or resting hours, the drive log module 109 may generate derivations 409 such as whether the driver has one or more "14 hour HOS violations" (i.e., number of times in a rolling week a driver may have 14 or more hours of service in a 24 hour period), "11 hour HOS violations" (i.e., number of times in a week in which driver had 11 or more hours of service in 14 hour period), "60 hour on-duty violation in 5 days violations" (i.e., number of times in a week a driver has more than 60 hours of driving within any 5 day window), excessive time on task violations, etc. Based on the derivations 409, the driver turnover prediction module 120 may identify one or more drivers that may be at risk of resigning. In other examples, the derivations 409 may include a number of hours that one of the one or more drivers rests in a time period during a week, a number of times that the driver violates rules or regulations, a number of times that the driver had sufficient hours of rest during the week, and a number of times that the driver did not have at least ten hours off duty in any day in the week. Yet even further, turnover prediction model 404 of the driver turnover prediction module 120 may determine, for example, number of late shift starts, number of early shift starts, total number of late night driving hours, etc., based on the transformation of the raw collected data, e.g., driver log information 121, from the driver log module 109. In some aspects, the raw collected information, e.g., the set 304 of driver log information 121, may produce over 1,000 various derivations 409 to measure driver performance, however, during the generation process, turnover prediction model 404 will select certain derivations 409 (e.g., parameters identified in Table 1) that may correspond to predictor variables, for use in identifying one or more at-risk drivers based on the set 304 of collected driver log information 121. In an example, for instance, extracting derivations 409 from the set 304 of driver log information 121 may include extracting selected derivations 409, e.g., predictor variables (e.g., 20 key variables from 1,000 variables) based on the above-noted historical analysis used to formulate turnover prediction model 404 for the at-risk drivers. As such, derivation extraction module 405 associated with driver turnover prediction module 120 extracts derivations 409 from the set 304 of driver log information 121, and/or from one or more different aggregated subsets 308 of the set 304, in accordance with one or more derivation rules 407 associated with a respective turnover prediction model 404.

At 212, method 200 may include applying the turnover prediction model to the derivations to identify detection of a retention condition. In some examples, the retention condition that may indicate the likelihood of a driver resigning for each of the one or more drivers in the fleet. In some examples, applying the turnover prediction model may include, for example, multiplying the derivations by the weights and then adding them together to come up with a value that is compared against a threshold or set of ranges associated with a certain prediction or probability of resigning identified in the turnover prediction model. Further, the one or more at-risk driver scoring 123 lists may include a driver identification (ID) 314 that identifies a particular driver and the likelihood of whether the driver will resign in a subsequent time period. Alternatively, or in addition, the one or more at-risk driver scoring lists 123 may further include a rank 318, which is a value that can be used to indicate the order of confidence for the respective driver relative to other confidence factors of other drivers that may be likely to resign.

At 214, method 200 may further include transmitting a notification message that includes identification of one or more at-risk drivers to the fleet operator. For example, in an aspect that refers to FIG. 4, driver turnover prediction module 120 and/or at-risk report generation module 415 may be configured to generate and transmit a notification message 417 that includes the list of one or more driver IDs 314 that are likely to resign in a subsequent time period. For instance, in one example, based on the likelihood of the driver resigning as reflected in the value of confidence factor, driver turnover prediction module 120 and/or at-risk report generation module 415 may generate a report including a listing of a subset of driver IDs 314, and, optionally, the corresponding confidence factor and, also optionally, the corresponding rank 318, for use by the user 126 (e.g., fleet operator), where the report may be included in notification message 417. In other words, for example, notification message 417 may include a report of all drivers (e.g., driver IDs 314) and their likelihood of resigning prediction, or some subset of the full list of drivers (e.g., driver IDs 314), such as only those ones having a value of confidence factor considered to be sufficiently high to warrant notification and/or remedial action (e.g., a value of confidence factor that is at or above a warning threshold). As such, in some examples, generating a report to alert the user 126 of at-risk drivers may include ranking the one or more drivers in accordance with their likelihood of resigning or deserting. The one or more drivers may be ranked in ascending or descending order.

Optionally, at 216, method 200 may further include triggering remedial measures to actively reduce risk factors that contribute to the likelihood of the driver resigning. For example, in an aspect that refers to FIG. 4, driver turnover prediction module 120 optionally may include a remediation module 419 configured to trigger one or more remedial measures 421. For instance, based on the identification of the at-risk drivers and/or notification message 417, remediation module 419 may automatically trigger or may initiate triggering, e.g., by user 126 (e.g., the fleet operator(s)) for one or more remedial measures 421 to prevent the driver from resigning. For instance, the one or more remedial measures 421 may include, but are not limited to, one or more actions such as adjusting a driver work schedule or adjusting the route that the driver is assigned so that the driver is home more frequently.

Figure 5:
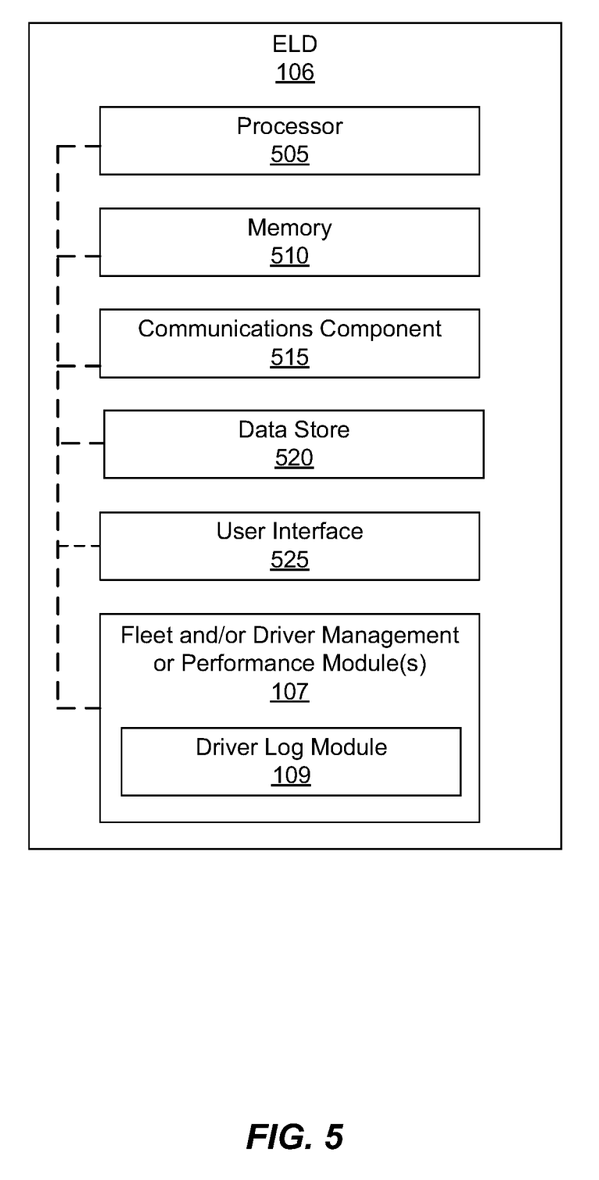
FIG. 5 is a block diagram of an example of an aspect of an electronic logging device (ELD) in accordance with the present disclosure.

Referring to FIG. 5, in an example that should not be construed as limiting, ELD 106 may include additional components that operate in conjunction with driver management and/or performance module(s) 107 and driver log module 109, which may be implemented in specially programmed computer readable instructions or code, firmware, hardware, or some combination thereof.

In an aspect, for example as represented by the dashed lines, features described herein with respect to the functions of driver log module 109 may be implemented in or executed using one or any combination of processor 505, memory 510, communications module 515, and data store 520. For example, driver management or performance module(s) 107 and driver log module 109 may be defined or otherwise programmed as one or more processor modules of processor 505. Further, for example, driver management or performance module(s) 107 and driver log module 109 may be defined as a computer-readable medium (e.g., a non-transitory computer-readable medium) stored in memory 510 and/or data store 520 and executed by processor 505. Moreover, for example, inputs and outputs relating to operations of driver management or performance module(s) 107 and driver log module 109 may be provided or supported by communications module 515, which may provide a bus between the modules of computer device or an interface for communication with external devices or modules.

Processor 505 can include a single or multiple set of processors or multi-core processors. Moreover, processor 505 can be implemented as an integrated processing system and/or a distributed processing system.

Memory 510 may operate to allow storing and retrieval of data used herein and/or local versions of applications and/or software and/or instructions or code being executed by processor 505, such as to perform the respective functions of driver log module 109 described herein. Memory 510 can include any type of memory usable by a computer, such as random access memory (RAM), read only memory (ROM), tapes, magnetic discs, optical discs, volatile memory, non-volatile memory, and any combination thereof.

Communications module 515 is operable to establish and maintain communications with one or more internal components/modules or external devices utilizing hardware, software, and services as described herein. Communications component 515 may carry communications between modules on ELD 106, as well as between user and external devices, such as devices located across a communications network and/or devices serially or locally connected to ELD 106. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

ELD 106 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

Figure 6:
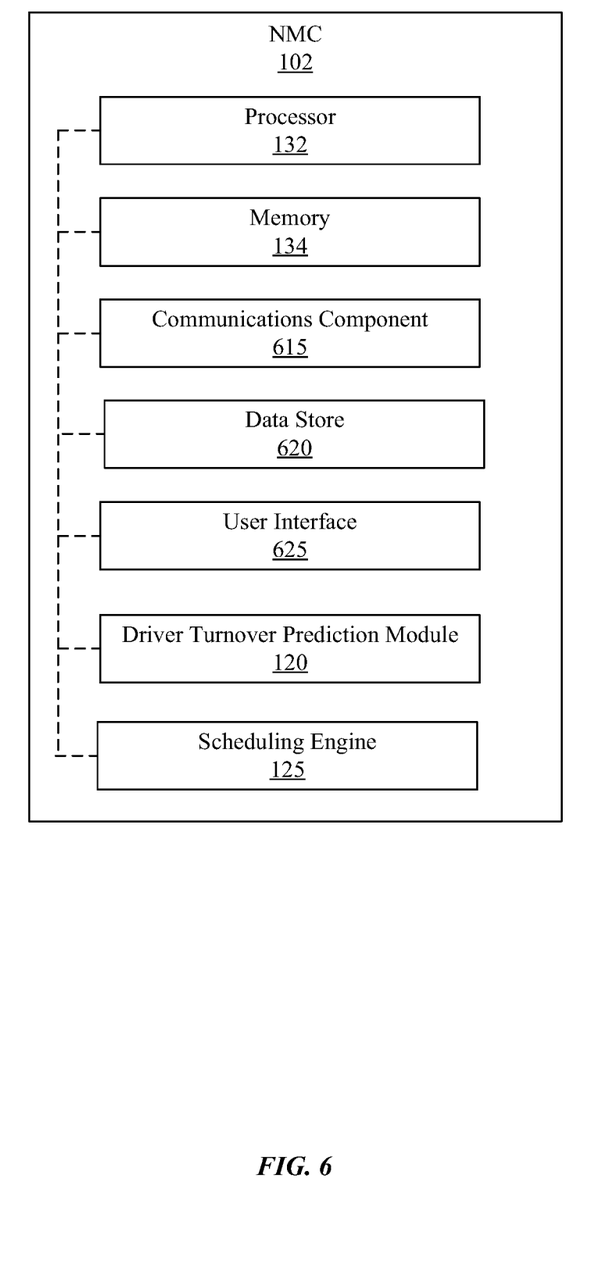
FIG. 6 is a block diagram of an example of an aspect of a network management center (NMC) in accordance with the present disclosure.

Referring to FIG. 6, in an example that should not be construed as limiting, NMC 102 may include additional components for providing driver log analytics and in particular for operating in conjunction with driver turnover prediction module 120, which may be implemented in specially programmed computer readable instructions or code, firmware, hardware, or some combination thereof.

In an aspect, for example as represented by the dashed lines, the features of driver turnover prediction module 120 and scheduling engine 125 described herein may be implemented in or executed using one or any combination of processor 132, memory 134, communications component 615, and data store 620. For example, driver turnover prediction module 120 may be defined or otherwise programmed as one or more processor modules of processor 132. Further, for example, driver turnover prediction module 120 may be defined as a computer-readable medium (e.g., a non-transitory computer-readable medium) stored in memory 134 and/or data store 610 and executed by processor 132.

Processor 132 can include a single or multiple set of processors or multi-core processors. Moreover, processor 132 can be implemented as an integrated processing system and/or a distributed processing system.

Memory 134 may be operable for storing and retrieving data used herein and/or local versions of applications and/or software and/or instructions or code being executed by processor 132, such as to perform the respective functions of the respective entities described herein. Memory 134 can include any type of memory usable by a computer, such as random access memory (RAM), read only memory (ROM), tapes, magnetic discs, optical discs, volatile memory, non-volatile memory, and any combination thereof.

Communications component 615 may be operable to establish and maintain communications with one or more internal components/modules and/or external devices utilizing hardware, software, and services as described herein. Communications component 615 may carry communications between modules on NMC 102, as well as between user and external devices, such as devices located across a communications network and/or devices serially or locally connected to NMC 102. For example, communications component 615 may include one or more buses, and may further include transmit chain modules and receive chain modules associated with a transmitter and receiver, respectively, or a transceiver, operable for interfacing with external devices.

Additionally, data store 620, which can be any suitable combination of hardware and/or software, which provides for mass storage of information, databases, and programs employed in connection with aspects described herein. For example, data store 620 may be a data repository for applications not currently being executed by processor 132.

NMC 102 may additionally include a user interface module 625 operable to receive inputs from a user, and further operable to generate outputs for presentation to the user. User interface module 625 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A driver log-based retention system, comprising:
    a processing system configured to:
        receive, from electronic logging devices (ELDs), driver log information associated with drivers, wherein each ELD is configured to track the driver log information for Hours of Service (HOS) compliance with each ELD configured to receive a current driving state manually entered by a driver, the driver log information comprising information associated with a driver associated with one or more vehicles and includes shift start variance information;

aggregate the driver log information for a predetermined time period;

transform the aggregated driver log information into a set of derivations derived from the aggregated driver log information for each of the one or more drivers in accordance with one or more derivation rules associated with a turnover prediction model; and apply the turnover prediction model to the set of derivations to generate a prediction report that identifies a retention condition of employment for one or more drivers who are at risk of resigning;

a transmitter configured to transmit a notification message, including the prediction report and an identification of the retention condition, to a scheduling engine; and the scheduling engine automatically modifying assigned routes of at-risk drivers based on the prediction report and the retention condition that identifies the risk of one or more drivers resigning.

2. The system of claim 1, wherein applying the turnover prediction model to the derivations to generate the prediction report comprises analyzing one or more predictor variables from the set of derivations, wherein the one or more predictor variables are selected from a group consisting of:
a total driving hours;
a shift start variance;
a number of early shift starts;
a number of late shift starts;
a number of HOS violations;
a number of on-duty not driving hours; and
a number of off-duty hours.

3. The system of claim 2, wherein applying the turnover prediction model to the set of derivations to generate the prediction report comprises:
assigning a variable weight to each of the one or more predictor variables for use in an equation to identify the retention condition of employment, wherein the retention condition of employment identifies at-risk drivers.

4. The system of claim 1, wherein applying the turnover prediction model to the set of derivations to generate the prediction report comprises:
determining a total driving hours during the predetermined time period for the one or more drivers based on the driver log information associated with each of the one or more drivers;
determining whether the total driving hours exceeds a threshold; and
generating the prediction report that identifies the retention condition based on the determining that the total driving hours exceeds a threshold for at-risk drivers.

5. The system of claim 1, wherein applying the turnover prediction model to the set of derivations to generate the prediction report comprises:
identifying an average shift start time for the one or more drivers;
determining a shift start variance for the predetermined time period for each of the one or more drivers based on identification of the average shift start time;
determining that the shift start variance exceeds a shift variance threshold; and generating the prediction report that identifies the retention condition based on the determining that the shift start variance exceeds a shift variance threshold for at-risk drivers.

6. The system of claim 1, wherein extracting the set of derivations comprises extracting a subset of at least one of the driver log information that indicate that a respective driver is in danger of resigning.

7. The system of claim 1, further comprising triggering a remedial measure for at least one of the one or more drivers based on a value of a confidence factor.

8. An apparatus for identifying at-risk drivers, comprising:
a processor; and
a memory coupled with the processor, wherein the memory includes instructions to:
receive, from electronic logging devices (ELDs), driver log information associated with drivers, wherein each ELD is configured to track the driver log information for Hours of Service (HOS) compliance with each ELD configured to receive a current driving state manually entered by a driver, the driver log information comprising information associated with a driver associated with one or more vehicles and includes shift start variance information;
aggregate the driver log information for a predetermined time period;
transform the aggregated driver log information into a set of derivations derived from the aggregated driver log information for each of the one or more drivers in accordance with one or more derivation rules associated with a turnover prediction model;
apply the turnover prediction model to the set of derivations to generate a prediction report that identifies a retention condition of employment for one or more drivers who are at risk of resigning; and
transmit a notification message, including the prediction report and an identification of the retention condition, to a scheduling engine that automatically modifies assigned routes of at-risk drivers based on the prediction report and the retention condition that identifies the risk of one or more drivers resigning.

9. The apparatus of claim 8, wherein the instructions to apply the turnover prediction model to the derivations to generate the prediction report are further executable by the processor to analyze one or more predictor variables from the set of derivations, wherein the one or more predictor variables are selected from a group consisting of:
a total driving hours;
a shift start variance;
a number of early shift starts;
a number of late shift starts;
a number of HOS violations;
a number of on-duty not driving hours; and
a number of off-duty hours.

10. The apparatus of claim 9, wherein the instructions to apply the turnover prediction model to the set of derivations to generate the prediction report are further executable by the processor to:
assign a variable weight to each of the one or more predictor variables for use in an equation to identify the retention condition of employment.

11. A method for identifying at-risk drivers, comprising:
receiving, from electronic logging devices (ELDs), driver log information associated with drivers, wherein each ELD is configured to track the driver log information for Hours of Service (HOS) compliance with each ELD configured to receive a current driving state manually entered by a driver, the driver log information comprising information associated with a driver associated with one or more vehicles and includes shift start variance information;

aggregating the driver log information for a predetermined time period;

transforming the aggregated driver log information into a set of derivations derived from the aggregated driver log information for each of the one or more drivers in accordance with one or more derivation rules associated with a turnover prediction model;

applying the turnover prediction model to the set of derivations to generate a prediction report that identifies a retention condition of employment for one or more drivers who are at risk of resigning; and transmitting a notification message, including the prediction report and an identification of the retention condition, to a scheduling engine;

automatically modifying, by the scheduling engine, assigned routes of at-risk drivers based on the prediction report and the retention condition that identifies the risk of one or more drivers resigning.

12. The method of claim 11, wherein applying the turnover prediction model to the derivations to generate the prediction report comprises analyzing one or more predictor variables from the set of derivations, wherein the one or more predictor variables are selected from a group consisting of:
 a total driving hours;
 a shift start variance;
 a number of early shift starts;
 a number of late shift starts;
 a number of HOS violations;
 a number of on-duty not driving hours; and
 a number of off-duty hours.

13. The method of claim 12, wherein applying the turnover prediction model to the set of derivations to generate the prediction report comprises:

assigning a variable weight to each of the one or more predictor variables for use in an equation to identify the retention condition of employment.

14. The method of claim 11, wherein applying the turnover prediction model to the set of derivations to generate the prediction report comprises:

determining a total driving hours during the predetermined time period for the one or more drivers based on the driver log information associated with each of the one or more drivers;

determining whether the total driving hours exceeds a threshold; and generating the prediction report that identifies the retention condition based on the determining that the total driving hours exceeds a threshold for at-risk drivers.

15. The method of claim 11, wherein applying the turnover prediction model to the set of derivations to generate the prediction report comprises:

identifying an average shift start time for the one or more drivers;

determining a shift start variance for the predetermined time period for each of the one or more drivers based on identification of the average shift start time;

determining that the shift start variance exceeds a shift variance threshold; and generating the prediction report that identifies the retention condition based on the determining that the shift start variance exceeds a shift variance threshold for the at-risk drivers.

16. The method of claim 11, wherein extracting the set of derivations comprises extracting a subset of at least one of the driver log information that indicate that a respective driver is in danger of resigning.

17. The method of claim 11, further comprising triggering a remedial measure for at least one of the one or more drivers based on a value of a confidence factor.

* * * * *